US011858785B2

(12) United States Patent
Minami

(10) Patent No.: US 11,858,785 B2
(45) Date of Patent: Jan. 2, 2024

(54) CRANE

(71) Applicant: TADANO LTD., Kagawa (JP)

(72) Inventor: Yoshimasa Minami, Kagawa (JP)

(73) Assignee: TADANO LTD., Kagawa (JP)

( * ) Notice: Subject to any disclaimer, the term of this patent is extended or adjusted under 35 U.S.C. 154(b) by 607 days.

(21) Appl. No.: 17/258,009

(22) PCT Filed: Jul. 22, 2019

(86) PCT No.: PCT/JP2019/028601
§ 371 (c)(1),
(2) Date: Jan. 5, 2021

(87) PCT Pub. No.: WO2020/026867
PCT Pub. Date: Feb. 6, 2020

(65) Prior Publication Data

US 2021/0276839 A1 Sep. 9, 2021

(30) Foreign Application Priority Data

Jul. 31, 2018 (JP) ................................ 2018-144630

(51) Int. Cl.
*B66C 13/22* (2006.01)
*B66C 13/06* (2006.01)
*B66C 13/44* (2006.01)

(52) U.S. Cl.
CPC ............ *B66C 13/22* (2013.01); *B66C 13/063* (2013.01); *B66C 13/44* (2013.01)

(58) Field of Classification Search
CPC ....... B66C 13/22; B66C 13/063; B66C 13/44; B66C 23/42; B66C 13/46; B66C 23/06; B66C 13/08
See application file for complete search history.

(56) References Cited

U.S. PATENT DOCUMENTS 6,140,930 A * 10/2000 Shaw ...................... B66C 13/46
340/685
9,120,650 B2 * 9/2015 Langer .................... B66C 13/02
(Continued)

FOREIGN PATENT DOCUMENTS

JP 2006-525928 A 11/2006
JP 2010-228905 A 10/2010
(Continued)

OTHER PUBLICATIONS

May 11, 2021, Indian Examination Report issued for related IN application No. 202017056000.
(Continued)

*Primary Examiner* — Michael Collins
(74) *Attorney, Agent, or Firm* — Paratus Law Group, PLLC

(57) ABSTRACT

A target trajectory signal is calculated by integrating a target speed signal inputted from a suspended-load moving operation tool and passing the integrated signal through a lowpass filter. Target position coordinates of a load are calculated from the target trajectory signal. The current position coordinates of a leading end of a boom are calculated from the attitude of a crane device. An unwinding amount of a wire rope is calculated from the current position coordinates of the load and the current position coordinates of the boom. A direction vector of the wire rope is calculated from the current position coordinates of the load and the target position coordinates of the load. Target position coordinates of the boom are calculated from the unwinding amount and the direction vector. An actuation signal of an actuator is generated from the target position coordinates of the boom.

4 Claims, 11 Drawing Sheets

(56) References Cited

U.S. PATENT DOCUMENTS

| | | | | |
|---|---|---|---|---|
| 9,266,700 | B2 * | 2/2016 | Schneider | B66C 13/04 |
| 9,346,656 | B2 * | 5/2016 | May | B66C 13/06 |
| 9,790,061 | B2 * | 10/2017 | Schneider | B66D 1/525 |
| 11,649,143 | B2 * | 5/2023 | Kanda | B66C 13/066 212/273 |
| 11,691,855 | B2 * | 7/2023 | Minami | B66C 13/40 212/276 |
| 11,718,510 | B2 * | 8/2023 | Minami | B66C 13/085 212/276 |
| 2013/0245817 | A1 * | 9/2013 | Schneider | B66C 13/02 700/228 |
| 2015/0217976 | A1 * | 8/2015 | Tanizumi | B66C 13/00 703/2 |
| 2019/0119078 | A1 * | 4/2019 | Palberg | B66C 13/063 |

FOREIGN PATENT DOCUMENTS

| | | | |
|---|---|---|---|
| JP | 2013-184826 | A | 9/2013 |
| JP | 2016-221661 | A | 12/2016 |

OTHER PUBLICATIONS

Sep. 3, 2019, International Search Report issued for related PCT application No. PCT/JP2019/028601.

Sep. 3, 2019, International Search Opinion issued for related PCT application No. PCT/JP2019/028601.

Hayashi et al., Trajectory Planning of Rotary Crane Control Based on Inverse Dynamics, Proceedings of the 23rd Annual Conference of the Robotics Society of Japan, Sep. 15-17, 2005, pp. 1-3, The Robotics Society of Japan.

* cited by examiner

CRANE

CROSS REFERENCE TO PRIOR APPLICATION

This application is a National Stage Patent Application of PCT International Patent Application No. PCT/JP2019/028601 (filed on Jul. 22, 2019) under 35 U.S.C. § 371, which claims priority to Japanese Patent Application No. 2018-144630 (filed on Jul. 31, 2018), which are all hereby incorporated by reference in their entirety.

TECHNICAL FIELD

The present invention relates to a crane.

BACKGROUND ART

Conventionally, as mobile cranes or the like, a crane in which each actuator is remotely manipulated has been proposed. As such crane, a remote manipulation terminal and a crane that enable easy and simple manipulation of the crane by matching a manipulation direction of a manipulation tool of the remote manipulation terminal and an operating direction of the crane with each other irrespective of a relative positional relationship between the crane and the remote manipulation terminal has been known. The crane is manipulated according to a manipulative command signal from the remote manipulation apparatus, the manipulative command signal being generated with reference to a load, and thus, it is possible to intuitively manipulate the crane without paying attention to an operating speed, an operating amount, an operating timing and the like of each of the actuators. For example, see Patent Literature (hereinafter abbreviated as PTL) 1.

The remote manipulation apparatus described in PTL 1 transmits a speed signal relating to a manipulation speed and a direction signal relating to a manipulation direction to a crane based on a manipulative command signal from a manipulation section. Accordingly, in the crane, at a start or stop of movement at which the speed signal from the remote manipulation apparatus is input in the form of a step function, discontinuous acceleration sometimes occurs, causing swinging of the load. Therefore, a technique in which swinging of a load is curbed using a filter for a speed signal, the filter curbing a signal within a particular frequency range, has been known. However, in a crane, responsiveness is lowered by applying a filter to a speed signal. Accordingly, the crane has a mismatch between movement of a load and the operator's feeling of manipulation, which may result in failure to move the load in a manner intended by the operator.

CITATION LIST

Patent Literature

Ptl 1
Japanese Patent Application Laid-Open No. 2010-228905

SUMMARY OF INVENTION

Technical Problem

An object of the present invention is to provide a crane that enables, when an actuator is controlled with reference to a load, moving the load in a manner intended by an operator while curbing swinging of the load.

Solution to Problem

The technical problem to be solved by the present invention has been stated above, and next, a solution to the problem will be explained.

The present invention provides a crane in which an actuator is controlled based on a target speed signal relating to a moving direction and a speed of a load suspended from a boom by a wire rope, the crane including: a manipulation tool with which an acceleration time, the speed and the moving direction of the load for the target speed signal are input; a swivel angle detection section for the boom; a luffing angle detection section for the boom: an extension/retraction length detection section for the boom; and a load position detection section that detects a current position of the load relative to a reference position, in which, preferably, the load position detection section detects the load and computes the current position of the load relative to the reference position, a target course signal is computed by integrating the target speed signal input from the manipulation tool and attenuating a frequency component in a predetermined frequency range via a filter expressed by Expression 1, and a target position of the load relative to the reference position is computed from the target course signal, a current position of a boom tip relative to the reference position is computed from a swivel angle detected by the swivel angle detection section, a luffing angle detected by the luffing angle detection section and an extension/retraction length detected by the extension/retraction length detection section, a let-out amount of the wire rope is computed from the current position of the load and the current position of the boom tip, a direction vector of the wire rope is computed from the current position of the load and the target position of the load, a target position of the boom tip for the target position of the load is computed from the let-out amount of the wire rope and the direction vector of the wire rope, and an operation signal for the actuator is generated based on the target position of the boom tip, [1]

(Expression 1)

$$G(s) = \frac{a}{(s+b)^c} \tag{1}$$

where each of a and b is a coefficient, c is an index and s is a differentiation element.

In the crane according to the present invention, coefficient a, coefficient b and index c in Expression 1 are determined based on the current position of the boom tip.

In the crane according to the present invention, coefficient a, coefficient b and index c in Expression 1 are determined based on the swivel angle detected by the swivel angle detection section, the luffing angle detected by the luffing angle detection section and the extension/retraction length detected by the extension/retraction length detection section.

The crane according to the present invention includes a database in which coefficient a, coefficient b and index c are set for each predetermined condition, in which coefficient a, coefficient b and index c corresponding to an arbitrary condition are selected from the database.

Advantageous Effects of Invention

The present invention produces effects as stated below.

With the crane according to the present invention, frequency components including singular points caused by a differentiation operation in computation of a target position of a boom are attenuated, and thus, control of the boom is stabilized. Consequently, it is possible to, when the actuator is controlled with reference to a load, move the load in a manner intended by an operator while curbing swinging of the load.

With the crane according to the present invention, frequency components of a target speed signal, the frequency components being attenuated by the filter, are determined according to a manner of an input by an operator, enabling approaching an operating state desired by the operator, the operating state being estimated from the manner of the input. Consequently, it is possible to, when the actuator is controlled with reference to a load, move the load in a manner intended by an operator while curbing swinging of the load.

With the crane according to the present invention, coefficient a, coefficient b and index c, which are determined in advance, are selected from the database according to a predetermined condition, and thus, the low-pass filter is set according to an operating condition without complicated computation being performed in real time. Consequently, it is possible to, when the actuator is controlled with reference to a load, move the load in a manner intended by an operator while curbing swinging of the load.

DESCRIPTION OF EMBODIMENTS

As a working vehicle according to an embodiment of the present invention, crane 1, which is a mobile crane (rough terrain crane), will be described below with reference to FIGS. 1 and 2. Note that although the present embodiment will be described in terms of crane (rough terrain crane) as a working vehicle, the working vehicle may also be an all-terrain crane, a truck crane, a truck loader crane, an aerial work vehicle, or the like.

Figure 1:
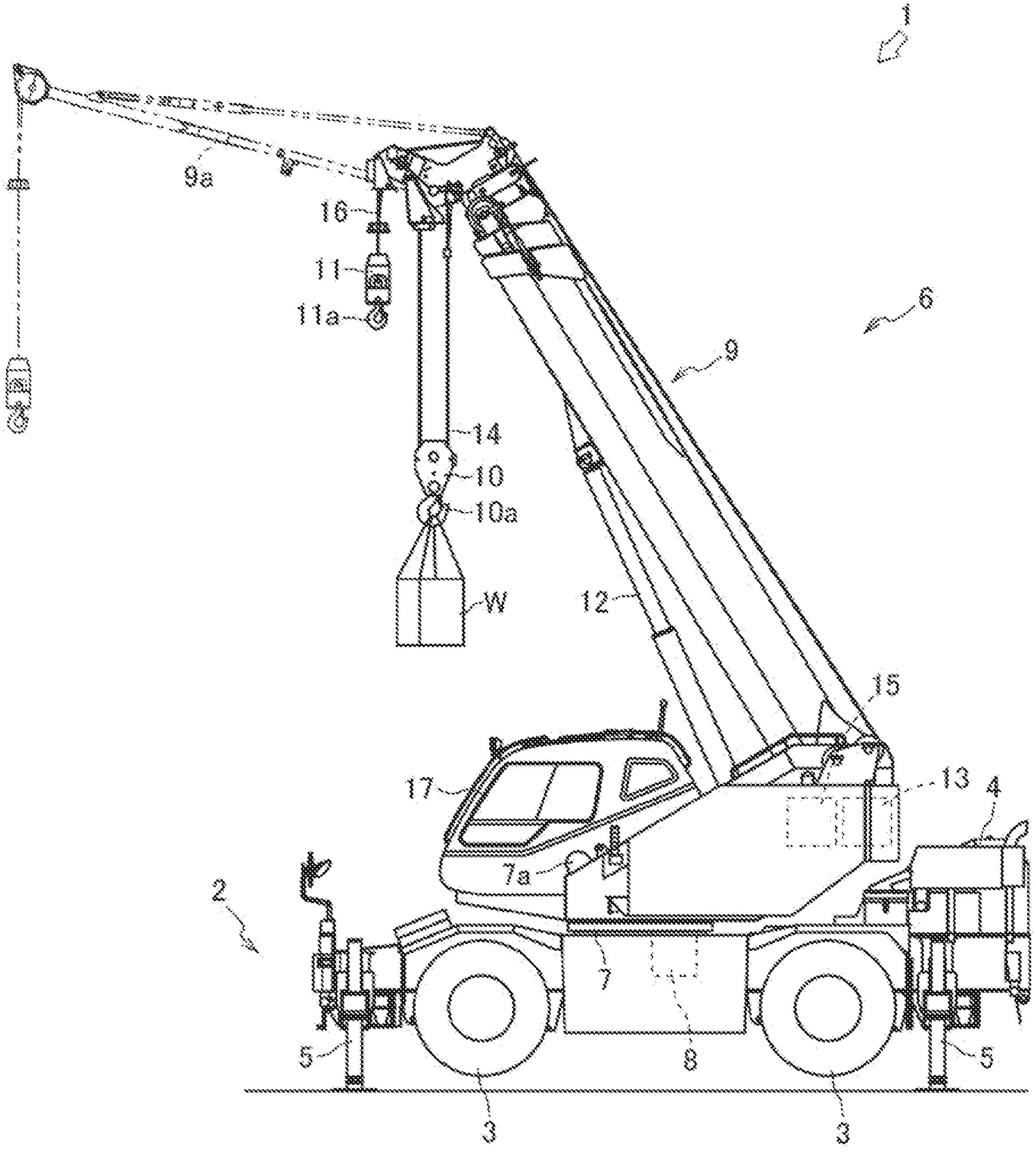
FIG. 1 is a side view illustrating an overall configuration of a crane.

As illustrated in FIG. 1, crane 1 is a mobile crane capable of moving to an unspecified place. Crane 1 includes vehicle 2, crane apparatus 6, which is a working apparatus, and manipulation terminal 32 with which crane apparatus 6 can be manipulated (see FIG. 2).

Vehicle 2 is a travelling body that carries crane apparatus 6. Vehicle 2 includes a plurality of wheels 3 and travels using engine 4 as a power source. Vehicle 2 is provided with outriggers 5. Outriggers 5 are composed of projecting beams hydraulically extendable on opposite sides in a width direction of vehicle 2 and hydraulic jack cylinders extendable in a direction perpendicular to the ground. Vehicle 2 can expand a workable region of crane 1 by extending outriggers 5 in the width direction of vehicle 2 and bringing the jack cylinders into contact with the ground.

Crane apparatus 6 is a working apparatus that hoists up load W with a wire rope. Crane apparatus 6 includes, for example, swivel base 7, boom 9, jib 9*a*, main hook block 10, sub hook block 11, hydraulic luffing cylinder 12, main winch 13, main wire rope 14, sub winch 15, sub wire rope 16 and cabin 17.

Swivel base 7 is a drive apparatus configured to enable crane apparatus 6 to swivel. Swivel base 7 is disposed on a frame of vehicle 2 via an annular bearing. Swivel base 7 is configured to be rotatable with a center of the annular bearing as a rotational center. Swivel base 7 is provided with hydraulic swivel motor 8, which is an actuator. Swivel base 7 is configured to be capable of swiveling in one and other directions via hydraulic swivel motor 8.

Each of swivel-base cameras 7*a* is a monitoring apparatus that takes an image of, for example, obstacles and people around swivel base 7. Swivel-base cameras 7*a* are provided on opposite, left and right, sides of the front of swivel base 7 and opposite, left and right, sides of the rear of swivel base 7. The swivel-base cameras 7*a* take images of respective areas around places at which swivel-base cameras 7*a* are installed, to cover an entire area surrounding swivel base 7 as a monitoring area. Furthermore, swivel-base cameras 7*a* disposed on the opposite, left and right, sides of the front of swivel base 7 are configured to be usable as a stereo camera set. In other words, swivel-base cameras 7*a* at the front of swivel base 7 can be configured as a load position detection section that detects positional information of suspended load W, by being used as a stereo camera set. Note that the load position detection section may be composed of later-described boom camera 9*b*. Also, the load position detection section only needs to be one that is capable of detecting positional information of load W such as a millimeter-wave radar, a GNSS apparatus, or the like.

Hydraulic swivel motor 8 is an actuator that is manipulated to rotate via swivel valve 23 (see FIG. 2), which is an electromagnetic proportional switching valve. Swivel valve 23 can control a flow rate of an operating oil supplied to hydraulic swivel motor 8 to any flow rate. In other words, swivel base 7 is configured to be controllable to have any swivel speed via hydraulic swivel motor 8 manipulated to rotate via swivel valve 23. Swivel base 7 is provided with swivel sensor 27 (see FIG. 2) that detects swivel angle θz (angle) and swivel speed of swivel base 7.

Boom 9 is a movable boom that supports a wire rope such that load W can be hoisted. Boom 9 is composed of a plurality of boom members. In boom 9, a base end of a base boom member is swingably provided at a substantial center of swivel base 7. Boom 9 is configured to be capable of being axially extended/retracted by moving the respective boom members with a non-illustrated hydraulic extension/retraction cylinder, which is an actuator. Also, boom 9 is provided with jib 9*a*.

The non-illustrated hydraulic extension/retraction cylinder is an actuator that is manipulated to extend and retract via extension/retraction valve 24 (see FIG. 2), which is electromagnetic proportional switching valve. Extension/retraction valve 24 can control a flow rate of an operating oil supplied to the hydraulic extension/retraction cylinder to any flow rate. Boom 9 is provided with extension/retraction sensor 28 that detects a length of boom 9 and vehicle-side azimuth sensor 29 that detects an azimuth with a tip of boom 9 as a center.

Boom camera 9*b* (see FIG. 2) is a sensing apparatus that takes an image of load W and features around load W. Boom camera 9*b* is provided at a tip portion of boom 9. Boom camera 9*b* is configured to be capable of taking an image of load W, and features and geographical features around crane 1 from vertically above load W.

Main hook block 10 and sub hook block 11 are suspending tools for suspending load W. Main hook block 10 is provided with a plurality of hook sheaves around which main wire rope 14 is wound and main hook 10*a* for suspending load W. Sub hook block 11 is provided with sub hook 11*a* for suspending load W.

Hydraulic luffing cylinder 12 is an actuator that luffs up and down boom 9 and holds a posture of boom 9. In hydraulic luffing cylinder 12, an end portion of a cylinder part is swingably coupled to swivel base 7 and an end portion of a rod part is swingably coupled to the base boom member of boom 9. Hydraulic luffing cylinder 12 is manipulated to extend or retract via luffing valve 25 (see FIG. 2), which is an electromagnetic proportional switching valve. Luffing valve 25 can control a flow rate of an operating oil supplied to hydraulic luffing cylinder 12 to any flow rate. Boom 9 is provided with luffing sensor 30 (see FIG. 2) that detects luffing angle θx.

Main winch 13 and sub winch 15 are winding apparatuses that pull in (wind) or let out (unwind) main wire rope 14 and sub wire rope 16. Main winch 13 is configured such that a main drum around which main wire rope 14 is wound is rotated by a non-illustrated main hydraulic motor, which is an actuator, and sub winch 15 is configured such that a sub drum around which sub wire rope 16 is wound is rotated by a non-illustrated sub hydraulic motor, which is an actuator.

The main hydraulic motor is manipulated to rotate via main valve 26*m* (see FIG. 2), which is an electromagnetic proportional switching valve. Main winch 13 is configured to be capable of being manipulated so as to have any pulling-in and letting-out speeds, by controlling the main hydraulic motor via main valve 26*m*. Likewise, sub winch 15 is configured to be capable of being manipulated so as to have any pulling-in and letting-out speeds, by controlling the sub hydraulic motor via sub valve 26*s* (see FIG. 2), which is an electromagnetic proportional switching valve. Main winch 13 and sub winch 15 are provided with winding sensors 43 (see FIG. 2) that detect let-out amounts I of main wire rope 14 and sub wire rope 16, respectively.

Cabin 17 is an operator compartment covered by a housing. Cabin 17 is mounted on swivel base 7. Cabin 17 is provided with a non-illustrated operator compartment. The operator compartment is provided with manipulation tools for manipulating vehicle 2 to travel, and swivel manipulation tool 18, luffing manipulation tool 19, extension/retraction manipulation tool 20, main drum manipulation tool 21*m*, sub drum manipulation tool 21*s*, and the like for manipulating crane apparatus 6 (see FIG. 2). Hydraulic swivel motor 8 is manipulatable with swivel manipulation tool 18. Hydraulic luffing cylinder 12 is manipulatable with luffing manipulation tool 19. The hydraulic extension/retraction cylinder is manipulatable with extension/retraction manipulation tool 20. The main hydraulic motor is manipulatable with main drum manipulation tool 21*m*. The sub hydraulic motor is manipulatable with sub drum manipulation tool 21*s*.

Figure 2:
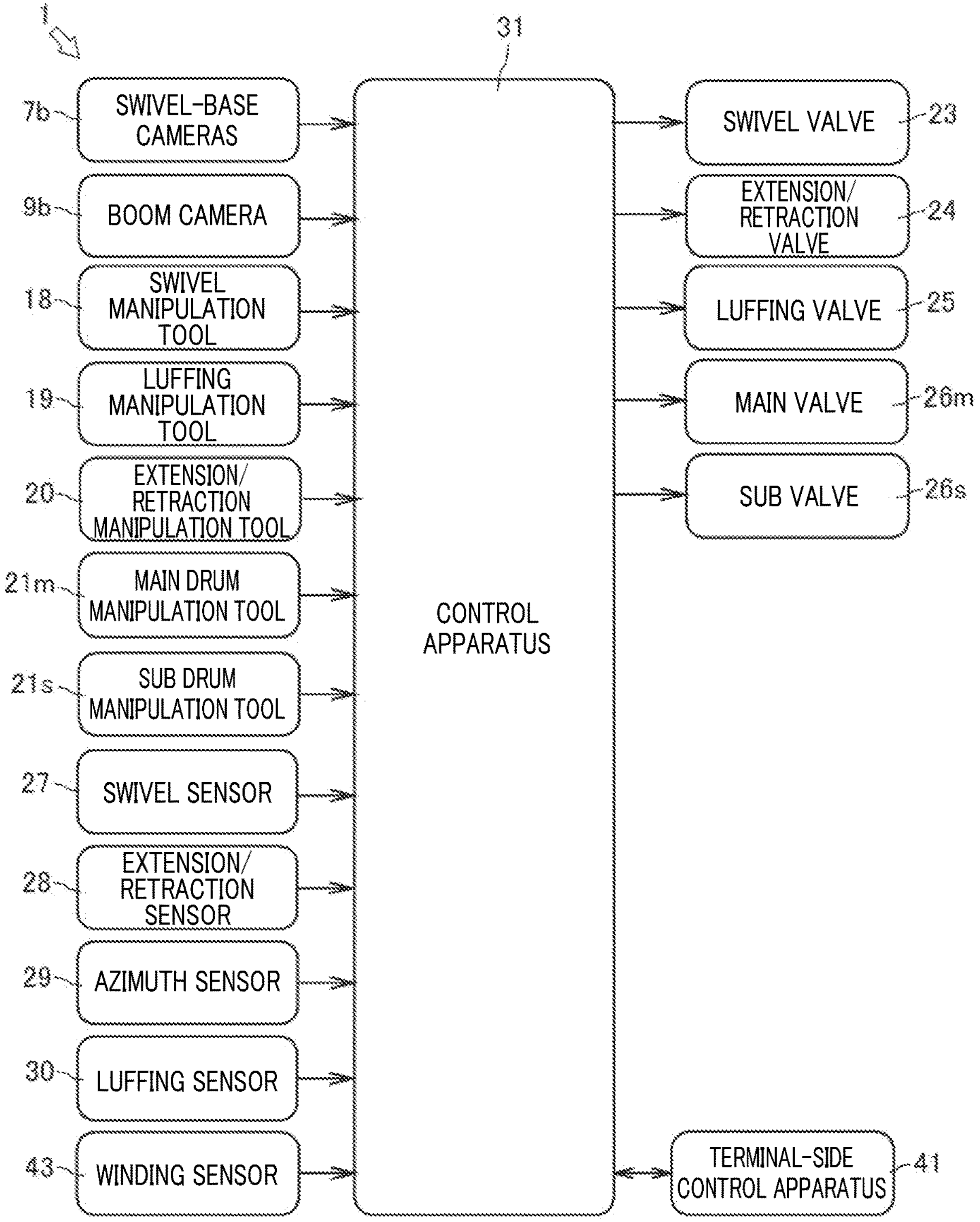
FIG. 2 is a block diagram illustrating a control configuration of the crane.

As illustrated in FIG. 2, control apparatus 31 is a control apparatus that controls the actuators of crane apparatus 6 via the respective manipulation valves. Control apparatus 31 is disposed inside cabin 17. Substantively, control apparatus 31 may have a configuration in which a CPU, a ROM, a RAM, an HDD and/or the like are connected to one another via a bus or may be composed of a one-chip LSI or the like. Control apparatus 31 stores various programs and/or data in order to control operation of the actuators, the switching valves, the sensors and/or the like.

Control apparatus 31 is connected to swivel-base cameras 7*a*, boom camera 9*b*, swivel manipulation tool 18, luffing manipulation tool 19, extension/retraction manipulation tool 20, main drum manipulation tool 21*m* and sub drum manipulation tool 21*s*, and is capable of obtaining image i1 from swivel-base cameras 7*a* and image i2 from boom camera 9*b* and is also capable of obtaining respective manipulation amounts of swivel manipulation tool 18, luffing manipulation tool 19, main drum manipulation tool 21*m* and sub drum manipulation tool 21*s*.

Control apparatus 31 is connected to terminal-side control apparatus 41 of manipulation terminal 32 and is capable of obtaining a control signal from manipulation terminal 32.

Control apparatus 31 is connected to swivel valve 23, extension/retraction valve 24, luffing valve 25, main valve 26*m* and sub valve 26*s*, and is capable of transmitting operation signals Md to swivel valve 23, luffing valve 25, main valve 26*m* and sub valve 26*s*.

Control apparatus 31 is connected to swivel sensor 27, extension/retraction sensor 28, azimuth sensor 29, luffing sensor 30 and winding sensor 43, and is capable of obtaining swivel angle θz of swivel base 7, extension/retraction length Lb, luffing angle θx, let-out amount l(n) of main wire rope 14 or sub wire rope 16 (hereinafter simply referred to as "wire rope") and an azimuth of the tip of boom 9.

Control apparatus 31 generates operation signals Md for swivel manipulation tool 18, luffing manipulation tool 19, main drum manipulation tool 21*m* and sub drum manipulation tool 21*s* based on manipulation amounts of the respective manipulation tools.

Crane 1 configured as described above is capable of moving crane apparatus 6 to any position by causing vehicle 2 to travel. Crane 1 is also capable of increasing a lifting height and/or an operating radius of crane apparatus 6, for example, by luffing up boom 9 to any luffing angle θ*x* with hydraulic luffing cylinder 12 by means of manipulation of luffing manipulation tool 19 and/or extending boom 9 to any length of boom 9 by means of manipulation of extension/retraction manipulation tool 20. Crane 1 is also capable of carrying load W by hoisting up load W with sub drum manipulation tool 21*s* and/or the like and causing swivel base 7 to swivel by means of manipulation of swivel manipulation tool 18.

Figure 3:
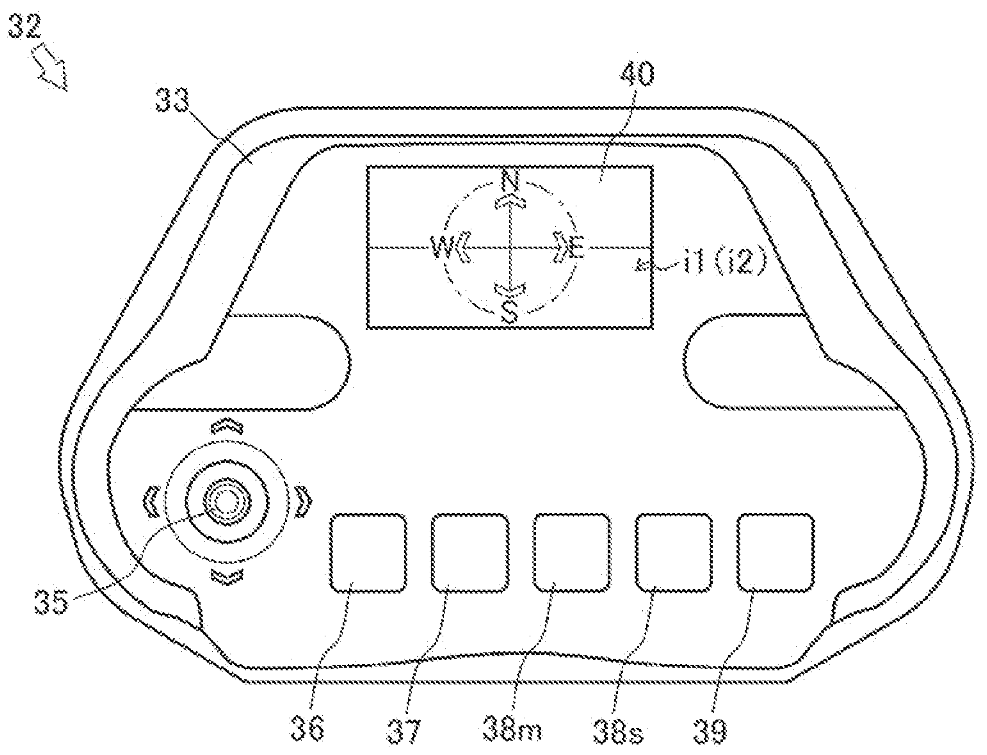
FIG. 3 is a plan view illustrating a schematic configuration of a manipulation terminal.
Figure 4:
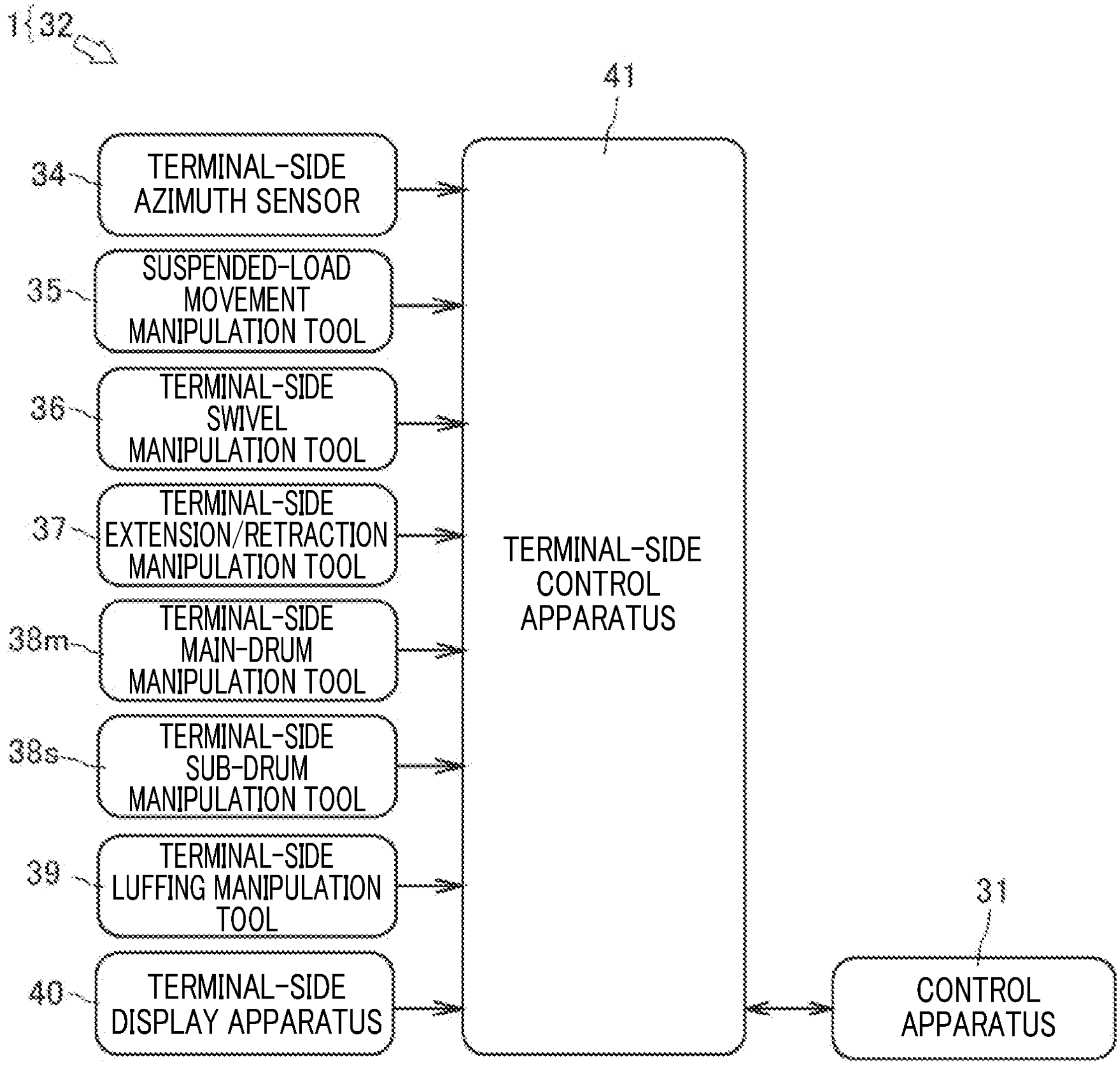
FIG. 4 is a block diagram illustrating a control configuration of the manipulation terminal.

As illustrated in FIGS. 3 and 4, manipulation terminal 32 is a terminal with which target speed signal Vd relating to a direction and a speed of movement of load W is input.

Figure 5:
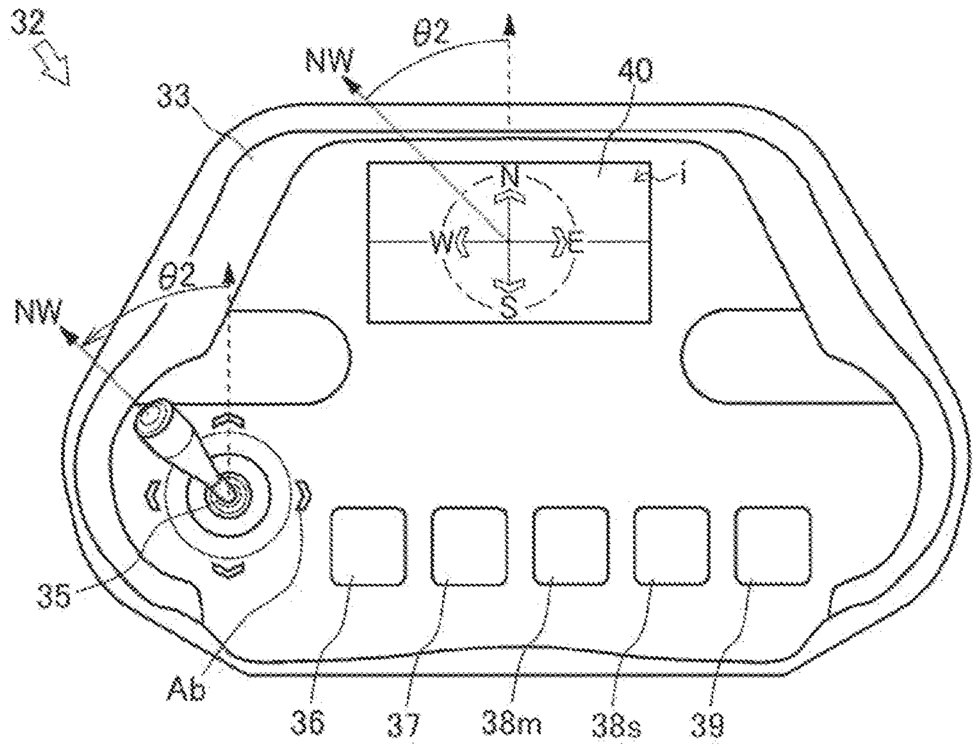
FIG. 5 illustrates an azimuth of a load carried in a case where a suspended-load movement manipulation tool is manipulated.

Manipulation terminal 32 includes: for example, housing 33; suspended-load movement manipulation tool 35, terminal-side swivel manipulation tool 36, terminal-side extension/retraction manipulation tool 37, terminal-side main drum manipulation tool 38*m*, terminal-side sub drum manipulation tool 38*s*, terminal-side luffing manipulation tool 39 and terminal-side display apparatus 40 disposed on a manipulation surface of housing 33; and terminal-side control apparatus 41 (see FIGS. 3 and 5). Manipulation terminal 32 transmits target speed signal Vd of load W that is generated by manipulation of suspended-load movement manipulation tool 35 or any of the manipulation tools to control apparatus 31 of crane 1 (crane apparatus 6).

As illustrated in FIG. 3, housing 33 is a main component of manipulation terminal 32. Housing 33 is formed as a housing having a size that allows the operator to hold the housing with his/her hand. Suspended-load movement manipulation tool 35, terminal-side swivel manipulation tool 36, terminal-side extension/retraction manipulation tool 37, terminal-side main drum manipulation tool 38*m*, terminal-side sub drum manipulation tool 38*s*, terminal-side luffing manipulation tool 39 and terminal-side display apparatus 40 are installed on the manipulation surface of housing 33.

Suspended-load movement manipulation tool 35 is a manipulation tool with which an instruction on a direction and a speed of movement of load W in a horizontal plane is input. Suspended-load movement manipulation tool 35 is composed of a manipulation stick erected substantially perpendicularly from the manipulation surface of housing 33 and a non-illustrated sensor that detects a tilt direction and a tilt amount of the manipulation stick. Suspended-load movement manipulation tool 35 is configured such that the manipulation stick can be manipulated to be tilted in any direction. Suspended-load movement manipulation tool 35 is configured to transmit a manipulation signal on the tilt direction and the tilt amount of the manipulation stick detected by the non-illustrated sensor with an upward direction in plan view of the manipulation surface (hereinafter simply referred to as "upward direction") as a direction of extension of boom 9, to terminal-side control apparatus 41 (see FIG. 2).

Terminal-side swivel manipulation tool 36 is a manipulation tool with which an instruction on a swivel direction and a speed of crane apparatus 6 is input. Terminal-side extension/retraction manipulation tool 37 is a manipulation tool with which an instruction on extension/retraction and a speed of boom 9 is input. Terminal-side main drum manipulation tool 38*m* (terminal-side sub drum manipulation tool 38*s*) is a manipulation tool with which an instruction on a rotation direction and a speed of main winch 13 is input. Terminal-side luffing manipulation tool 39 is a manipulation tool with which an instruction on luffing and a speed of boom 9 is input. Each manipulation tool is composed of a manipulation stick substantially perpendicularly erected from the manipulation surface of housing 33 and a non-illustrated sensor that detects a tilt direction and a tilt amount of the manipulation stick. Each manipulation tool is configured to be tiltable to one side and the other side.

Terminal-side display apparatus 40 displays various kinds of information such as postural information of crane 1, information on load W and/or the like. Terminal-side display apparatus 40 is configured by an image display apparatus such as a liquid-crystal screen or the like. Terminal-side display apparatus 40 is provided on the manipulation surface of housing 33. Terminal-side display apparatus 40 displays an azimuth with the direction of extension of boom 9 as the upward direction in plan view of terminal-side display apparatus 40.

As illustrated in FIG. 4, terminal-side control apparatus 41, which is a control section, controls manipulation terminal 32. Terminal-side control apparatus 41 is disposed inside housing 33 of manipulation terminal 32. Substantively, terminal-side control apparatus 41 may have a configuration in which a CPU, a ROM, a RAM, an HDD and/or the like are connected to one another via a bus or may be composed of a one-chip LSI or the like. Terminal-side control apparatus 41 stores various programs and/or data in order to control operation of suspended-load movement manipulation tool 35, terminal-side swivel manipulation tool 36, terminal-side extension/retraction manipulation tool 37, terminal-side main drum manipulation tool 38*m*, terminal-side sub drum manipulation tool 38*s*, terminal-side luffing manipulation tool 39, terminal-side display apparatus 40 and/or the like.

Terminal-side control apparatus 41 is connected to suspended-load movement manipulation tool 35, terminal-side swivel manipulation tool 36, terminal-side extension/retraction manipulation tool 37, terminal-side main drum manipulation tool 38*m*, terminal-side sub drum manipulation tool 38*s* and terminal-side luffing manipulation tool 39, and is capable of obtaining manipulation signals each including a tilt direction and a tilt amount of the manipulation stick of the relevant manipulation tool.

Terminal-side control apparatus 41 is capable of generating target speed signal Vd of load W from manipulation signals of the respective sticks, the manipulation signals being obtained from the respective sensors of terminal-side swivel manipulation tool 36, terminal-side extension/retraction manipulation tool 37, terminal-side main drum manipulation tool 38*m*, terminal-side sub drum manipulation tool 38*s* and terminal-side luffing manipulation tool 39. Also, terminal-side control apparatus 41 is connected to control apparatus 31 of crane apparatus 6 wirelessly or via a wire, and is capable of transmitting generated target speed signal Vd of load W to control apparatus 31 of crane apparatus 6.

Next, control of crane apparatus 6 by manipulation terminal 32 will be described with reference to FIGS. 5 and 6.

As illustrated in FIG. 5, when suspended-load movement manipulation tool 35 of manipulation terminal 32 is manipulated to be tilted leftward to a direction in which tilt angle θ2 is 450 relative to the upward direction by an arbitrary tilt amount in a state in which the tip of boom 9 faces north, terminal-side control apparatus 41 obtains a manipulation signal on a tilt direction and a tilt amount of a tilt to northwest, which is the direction in which tilt angle θ2 is 45°, from north, which is an extension direction of boom 9, from the non-illustrated sensor of suspended-load movement manipulation tool 35. Furthermore, terminal-side control apparatus 41 computes target speed signal Vd for moving load W to northwest at a speed according to the tilt amount from the obtained manipulation signal, every unit time t. Manipulation terminal 32 transmits computed target speed signal Vd to control apparatus 31 of crane apparatus 6 every unit time t (see FIG. 4).

Figure 6:
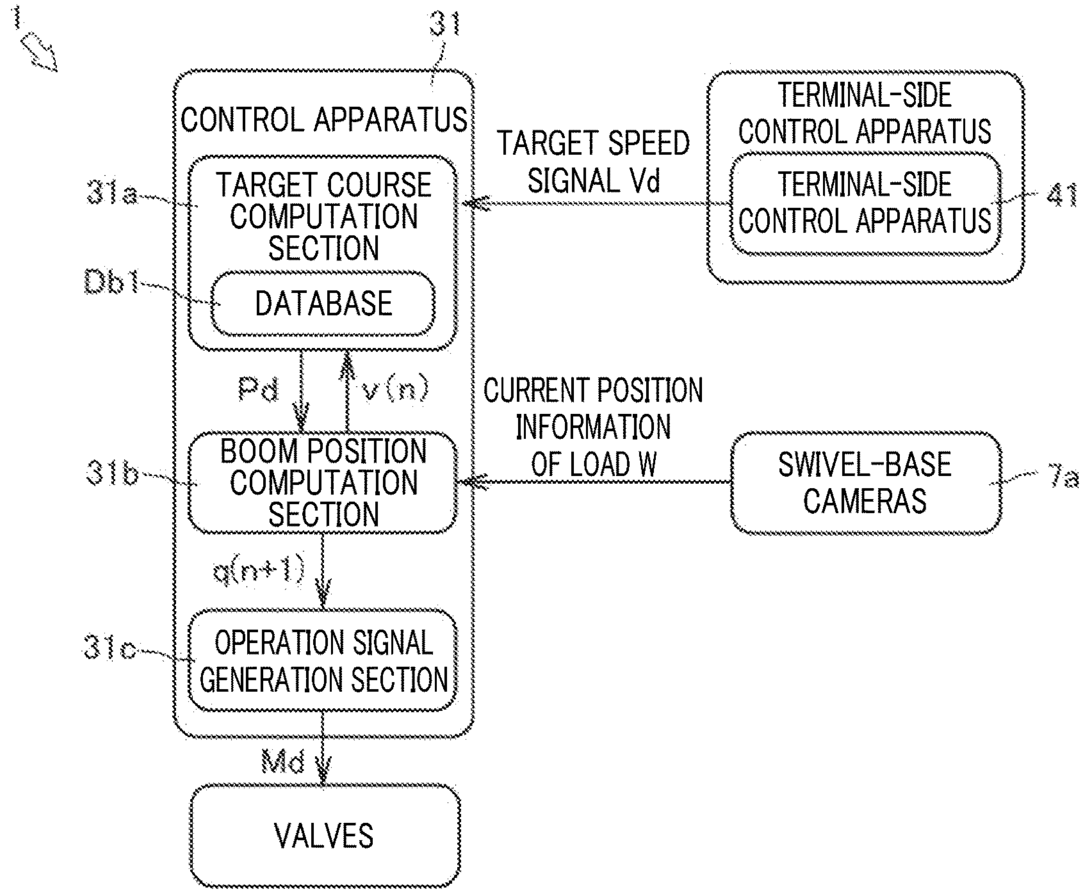
FIG. 6 is a block diagram illustrating a control configuration of a control apparatus in a first embodiment.

As illustrated in FIG. 6, upon receiving target speed signal Vd from manipulation terminal 32 every unit time t, target course computation section 31*a* of control apparatus 31 computes target course signal Pd for load W based on an azimuth of the tip of boom 9, the azimuth being obtained from azimuth sensor 29. Furthermore, target course computation section 31*a* computes target position coordinate p(n+1) of load W, which is a target position of load W, from target course signal Pd. Operation signal generation section 31*c* of control apparatus 31 generates respective operation signals Md for swivel valve 23, extension/retraction valve 24, luffing valve 25, main valve 26*m* and sub valve 26*s* to move load W to target position coordinate p(n+1). As illustrated in FIG. 5, crane 1 moves load W toward northwest, which is the tilt direction of suspended-load movement manipulation tool 35, at a speed according to the tilt amount. In this case, crane 1 controls hydraulic swivel motor 8, a hydraulic extension/retraction cylinder, hydraulic luffing cylinder 12, the main hydraulic motor and/or the like based on the operation signals Md.

Crane 1 configured as described above obtains target speed signal Vd on a moving direction and a speed based on a direction of manipulation of suspended-load movement manipulation tool 35 with reference to the extension direction of boom 9, from manipulation terminal 32 every unit time and determines target position coordinate p(n+1) of load W, and prevents the operator from lose recognition of a direction of operation of crane apparatus 6 relative to a direction of manipulation of suspended-load movement manipulation tool 35. In other words, a direction of manipulation of suspended-load movement manipulation tool 35 and a direction of movement of load W are computed based on the extension direction of boom 9, which is a common reference. Consequently, it is possible to easily and simply manipulate crane apparatus 6. Note that although in the present embodiment, manipulation terminal 32 is provided inside cabin 17, but may be configured as a remote manipulation terminal that can remotely be manipulated from the outside of cabin 17, by providing a terminal-side radio device.

Next, a first embodiment of a control process for computing target course signal Pd for load W, target course signal Pd being provided for generating operation signals Md, and target position coordinate q(n+1) of the tip of boom 9 in control apparatus 31 of crane apparatus 6 will be described with reference to FIGS. 6 to 12. Control apparatus 31 includes target course computation section 31*a*, boom position computation section 31*b* and operation signal generation section 31*c*. Also, control apparatus 31 is configured to be capable of obtaining current positional information of load W using the set of swivel-base cameras 7*a* on the opposite, left and right, sides of the front of swivel base 7 as a stereo camera, which is a load position detection section (see FIG. 2).

As illustrated in FIG. 6, target course computation section 31*a* is a part of control apparatus 31 and converts target speed signal Vd for load W into target course signal Pd for load W. Target course computation section 31*a* can obtain target speed signal Vd for load W, which is composed of a moving direction and a speed of load W, from manipulation terminal 32 every unit time t. Also, target course computation section 31*a* can compute target positional information for load W by integrating obtained target speed signal Vd. Target course computation section 31*a* is also configured to apply low-pass filter Lp to the target positional information for load W to convert target positional information for load W into target course signal Pd, which is target course information for load W, every unit time t.

Figure 7:
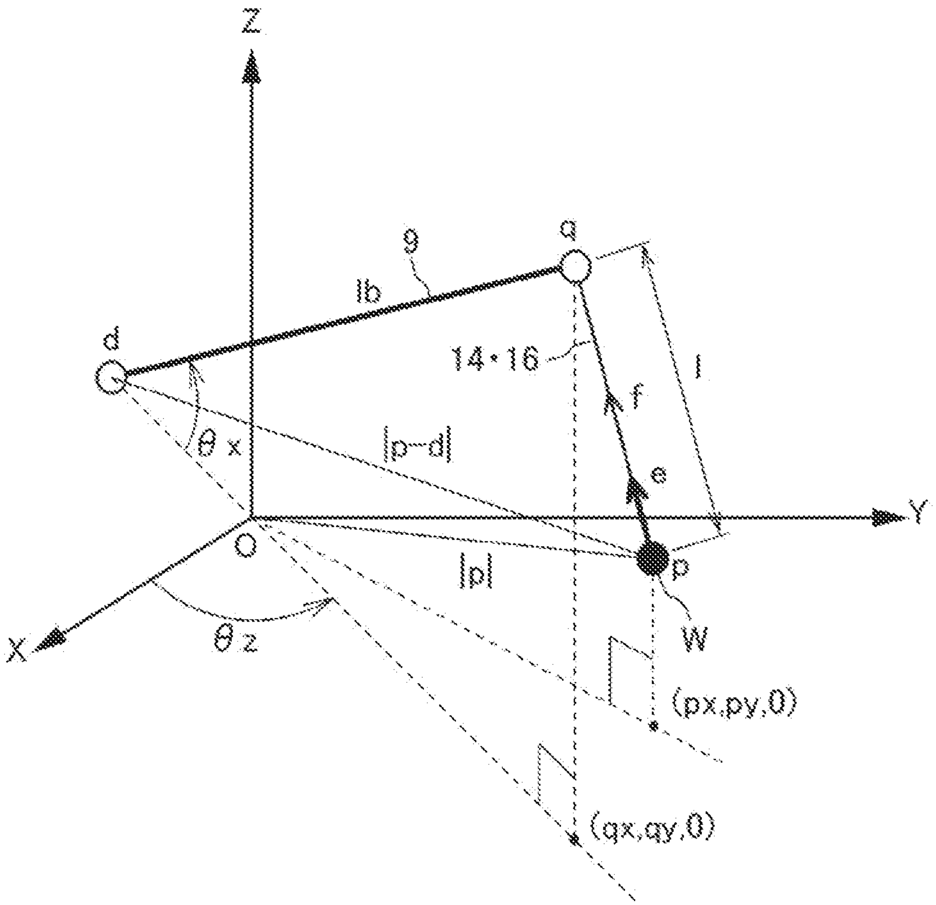
FIG. 7 is a diagram illustrating an inverse dynamics model of the crane.

As illustrated in FIGS. 6 and 7, boom position computation section 31*b* is a part of control apparatus 31 and computes a position coordinate of the tip of boom 9 from postural information of boom 9 and target course signal Pd for load W. Boom position computation section 31*b* can obtain target course signal Pd from target course computation section 31*a*. Boom position computation section 31*b* can obtain swivel angle θz(n) of swivel base 7 from swivel sensor 27, obtain extension/retraction length lb(n) from extension/retraction sensor 28, obtain luffing angle θx(n) from luffing sensor 30, obtain let-out amount l(n) of main wire rope 14 or sub wire rope 16 (hereinafter simply referred to as "wire rope") from winding sensor 43 and obtain current positional information of load W from an image of load W taken by the set of swivel-base cameras 7*a* disposed on the opposite, left and right, sides of the front of swivel base 7 (see FIG. 2).

Boom position computation section 31*b* can compute current position coordinate p(n) of load W from the obtained current positional information of load W and compute current position coordinate q(n) of the tip (position from which the wire rope is let out) of boom 9 (hereinafter simply referred to as "current position coordinate q(n) of boom 9"), which is a current position of the tip of boom 9, from obtained swivel angle θz(n), obtained extension/retraction length lb(n) and obtained luffing angle θx(n). Also, boom position computation section 31*b* can compute let-out amount l(*n*) of the wire rope from current position coordinate p(n) of load W and current position coordinate q(n) of boom 9. Furthermore, boom position computation section 31*b* can compute direction vector e(n+1) of the wire rope from which load W is suspended, from current position coordinate p(n) of load W and target position coordinate p(n+1) of load W, which is a position after a lapse of unit time t. Boom position computation section 31*b* is configured to compute target position coordinate q(n+1) of boom 9, which is a position of the tip of boom 9 after the lapse of unit time t, from target position coordinate p(n+1) of load W and direction vector e(n+1) of the wire rope, using inverse dynamics.

Operation signal generation section 31*c* is a part of control apparatus 31 and generates operation signals Md for the actuators from target position coordinate q(n+1) of boom 9 after the lapse of unit time t. Operation signal generation section 31*c* can obtain target position coordinate q(n+1) of boom 9 after the lapse of unit time t from boom position computation section 31*b*. Operation signal generation section 31*c* is configured to generate operation signals Md for swivel valve 23, extension/retraction valve 24, luffing valve 25, and main valve 26*m* or sub valve 26*s*.

Next, as illustrated in FIG. 7, control apparatus 31 determines an inverse dynamics model for crane 1 in order to compute target position coordinate q(n+1) of the tip of boom 9. The inverse dynamics model is defined on a XYZ coordinate system and origin O is a center of swivel of crane 1. Control apparatus 31 defines q, p, lb, θx, θz, 1, f and e, respectively, in the inverse dynamics model. The sign q denotes, for example, current position coordinate q(n) of the tip of boom 9 and p denotes, for example, current position coordinate p(n) of load W. The sign lb denotes, for example, extension/retraction length lb(n) of boom 9 and θx denotes, for example, luffing angle θx(n), and θz denotes, for example, swivel angle θz(n). The sign 1 denotes, for example, let-out amount l(*n*) of the wire rope, f denotes tension f of the wire rope, and e denotes, for example, direction vector e(n) of the wire rope.

In the inverse dynamics model defined as described above, a relationship between target position q of the tip of boom 9 and target position p of load W is represented by Expression 2 using target position p of load W, mass m of load W and spring constant kf of the wire rope, and target position q of the tip of boom 9 is computed according to Expression 3, which is a function of time for load W.

[2]

$$m\ddot{p}=mg+f=mg+k_f(q-p) \quad (2)$$

. . . (Expression 2) and

[3]

$$q(t)=p(t)+l(t,\alpha)e(t)=q(p(t),\ddot{p}(t),\alpha) \quad (3)$$

. . . (Expression 3), wherein f is a tension of wire rope, $k_f$ is a spring constant, m is a mass of load W, q is a current position or target position of the tip of boom 9, p is a current position or target position of load W, 1 is a let-out amount of the wire rope, e is a direction vector and g is a gravitational acceleration.

Low-pass filter Lp attenuates frequencies that are equal to or higher than a predetermined frequency. Target course computation section 31*a* curbs occurrence of a singular point (abrupt positional change) caused by a differential operation, by applying low-pass filter Lp to target position information of load W. Low-pass filter Lp is formed by transfer function G(s) in Expression 1. In Expression 1, each of a and b is coefficient and c is an index. Target course computation section 31*a* includes database Dv1 in which coefficients a, b and indexes c set in advance for each settling time Ts of target speed signal Vd and each signal magnitude V of target speed signal Vd by experiments or the like (see FIG. 7). Low-pass filter Lp is configured such that coefficients a, b and index c of transfer function G(s) are set to arbitrary values based on settling time Ts and signal magnitude V of target speed signal Vd. Note that although in the present embodiment, transfer function G(s) of low-pass filter Lp is expressed in the form of Expression 1, the form of transfer function G(s) only needs to be a form capable of expressing arbitrary transfer function G(s) using coefficients a, b and index c stored in database Dv1.

(Expression 1)

$$G(s)=\frac{a}{(s+b)^c} \quad (1)$$

Let-out amount l(n) of the wire rope is computed according to Expression 4 below.

Let-out amount l(*n*) of the wire rope is defined by a distance between current position coordinate q(n) of boom 9, which is a position of the tip of boom 9, and current position coordinate p(n) of load W, which is a position of load W.

[4]

$$l(n)^2=|q(n)-p(n)|^2 \quad (4)$$

. . . (Expression 4)

Direction vector e(n) of the wire rope is computed according to Expression 5 below.

Direction vector e(n) of the wire rope is a vector of tension f (see Expression 2) of the wire rope for a unit length. Tension f of the wire rope is computed by subtracting the gravitational acceleration from an acceleration of load W, the acceleration being computed from current position coordinate p(n) of load W and target position coordinate p(n+1) of load W after the lapse of unit time t.

[5]

(Expression 5)

$$e(n)=\frac{f}{|f|}=\frac{\ddot{p}(n)-g}{|\ddot{p}(n)-g|} \quad (5)$$

Target position coordinate q(n+1) of boom 9, which is a target position of the tip of boom 9 after the lapse of unit time t, is computed from Expression 6 representing Expression 2 as a function of n. Here, a denotes swivel angle θz(n) of boom 9.

Target position coordinate q(n+1) of boom 9 is computed from let-out amount l(n) of the wire rope, target position coordinate p(n+1) of load W and direction vector e(n+1) using inverse dynamics.

[6]

$$q(n+1)=p(n+1)+l(n,\alpha)e(t+1)=q(p(n+1),\ddot{p}(n+1),\alpha) \quad (6)$$

. . . (Expression 6)

Next, a first embodiment of a method of determining coefficients a, b and index c (see Expression 1) of transfer function G(s) of low-pass filter Lp in control apparatus 31 will be described with reference to FIG. 8.

Figure 8:
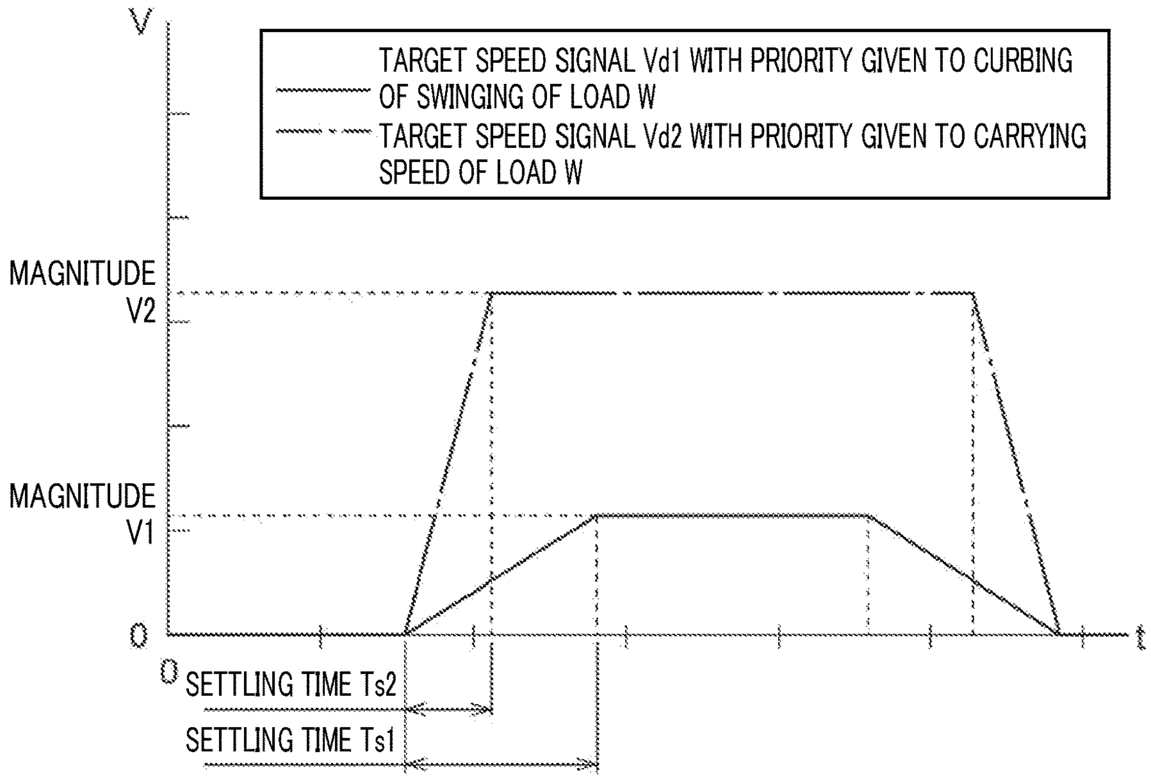
FIG. 8 is a diagram illustrating examples of target speed signals.

As illustrated in FIG. 8, signal magnitude V of target speed signal Vd and signal settling time Ts until signal magnitude V becomes constant are determined from required time until suspended-load movement manipulation tool 35 of manipulation terminal 32 is tilted to an arbitrary tilt angle and the tilt angle. For example, where crane apparatus 6 is manipulated with priority given to curbing of swinging of load W to carry load W with good accuracy, an operator manipulates suspended-load movement manipulation tool 35 such that the tilt angle becomes smaller and required time for manipulation for tilting become longer than those at the time of normal manipulation for tilting. Consequently, terminal-side control apparatus 41 of manipulation terminal 32 generates target speed 10 signal Vd1 having signal settling time Ts1 that is longer than a settling time at the time of normal manipulation for tilting and signal magnitude V1 that is smaller than that for a tilt angle at the time of normal manipulation for tilting (see solid line in FIG. 8). Also, where crane apparatus 6 is manipulated with priority given to a speed of load W to allow occurrence of swinging to a certain extent, the operator manipulates suspended-load movement manipulation tool 35 such that the tilt angle becomes larger and required time for manipulation for tilting become shorter than those at the time of normal manipulation for tilting. Consequently, terminal-side control apparatus 41 generates target speed signal Vd2 having signal settling time Ts2 that is shorter than a settling time at the time of normal manipulation for tilting and signal magnitude V2 that is larger than that for the tilt angle at the time of normal manipulation for tilting (see alternate long and short dash line in FIG. 9).

Next, target course computation section 31*a* of control apparatus 31 computes target position information of load W by integrating target speed signal Vd obtained from terminal-side control apparatus 41 of manipulation terminal 32. Furthermore, based on obtained settling time Ts and signal magnitude V of target speed signal Vd, target course computation section 31*a* obtains corresponding coefficients a, b and index c from database Dv1 and computes transfer function G(s) of low-pass filter Lp (see FIG. 6). For example, if target course computation section 31*a* obtains target speed signal Vd1 from terminal-side control apparatus 41, target course computation section 31*a* selects coefficients a1, b1 and index c1 that curb swinging of load W and improve carriage accuracy, from database db based on signal settling time Ts1 and signal magnitude V1. Also, if target course computation section 31_a_ obtains target speed signal Vd2 from terminal-side control apparatus 41, target course computation section 31_a_ selects coefficients a2, b2 and index c2 that cause load W to be carried fast while allowing swinging of load W to a certain extent, from database db based on signal settling time Ts2 and signal magnitude V2.

Next, a control process for computation of target course signal Pd for load W and computation of target position coordinate q(n+1) of the tip of boom 9 in order to generate operation signals Md in control apparatus 31 will be described in detail with reference to FIGS. 9 to 12.

Figure 9:
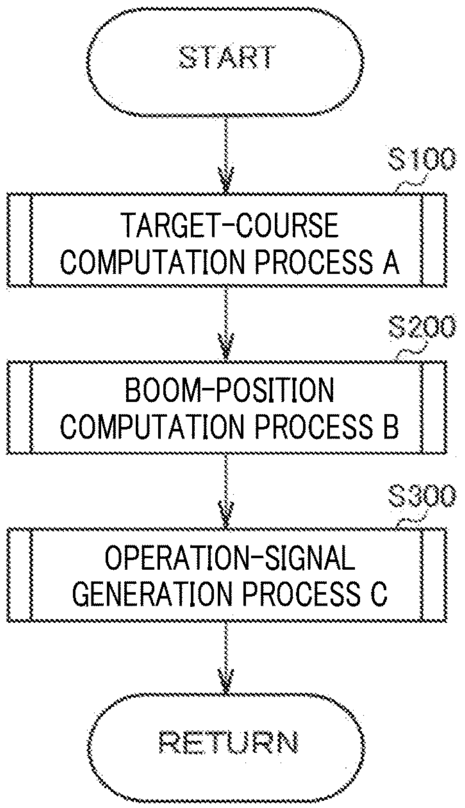
FIG. 9 is a flowchart illustrating a control process in a method of controlling the crane.
Figure 10:
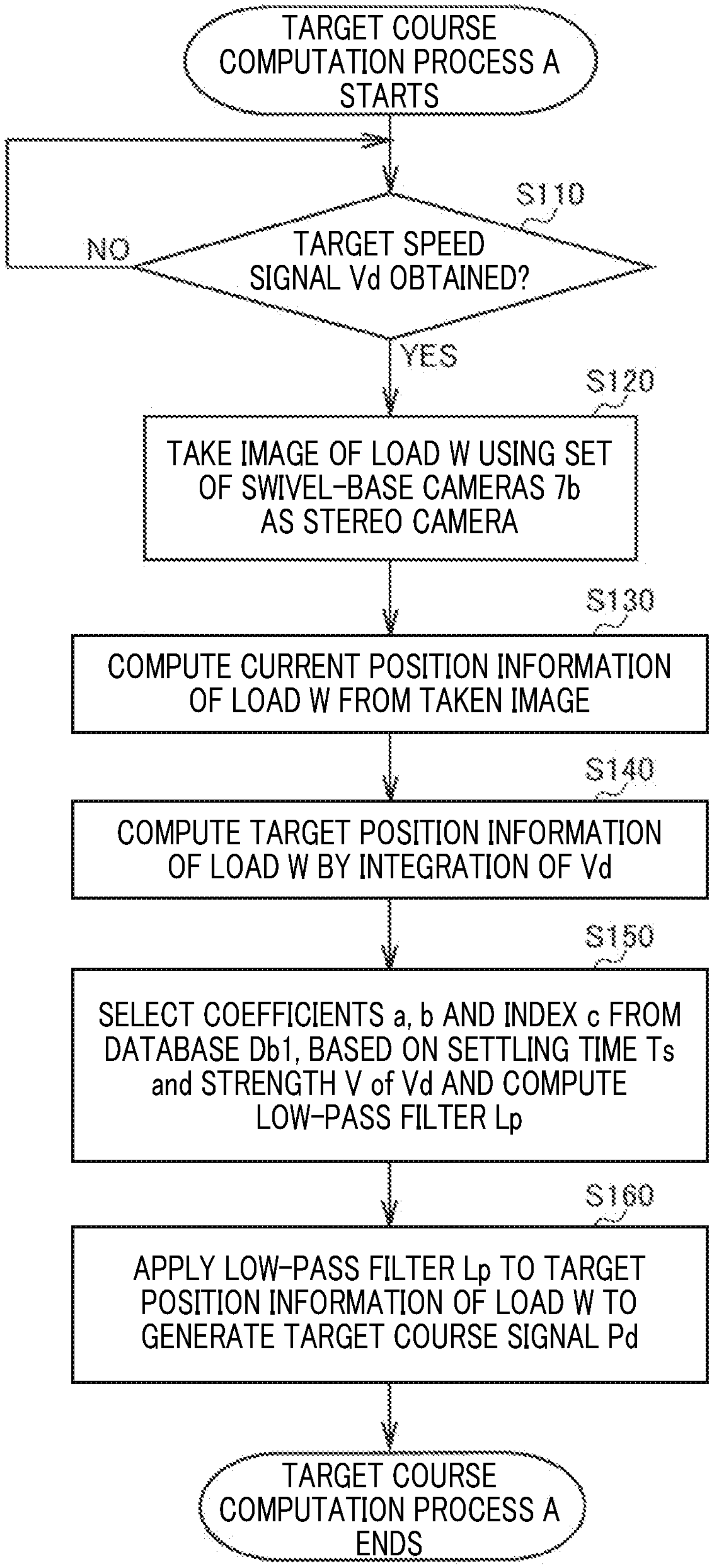
FIG. 10 is a flowchart illustrating a target-course computation process in the first embodiment.

As illustrated in FIG. 9, in S100, control apparatus 31 starts target-course computation process A in a method for controlling crane 1 and makes the control proceed to step S110 (see FIG. 10). Then, upon completion of target-course computation process A, the control proceeds to step S200 (see FIG. 9).

Figure 11:
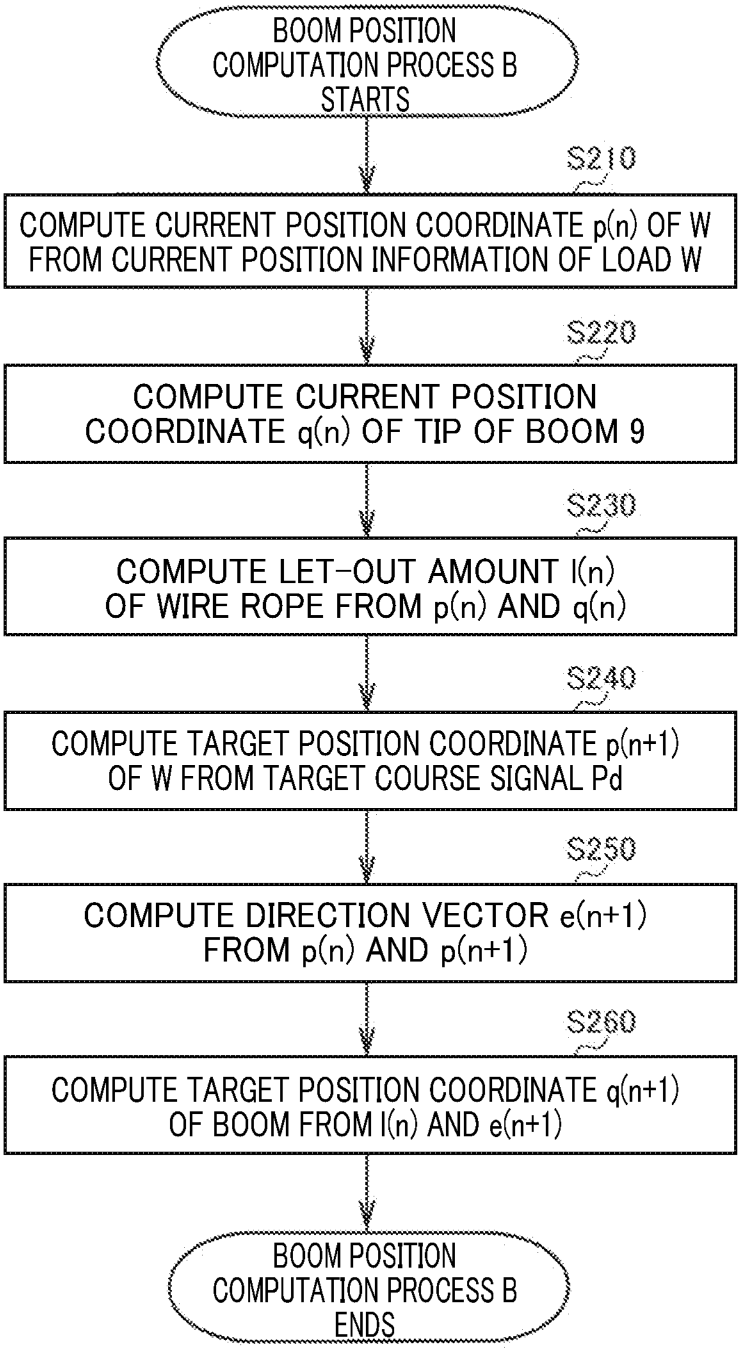
FIG. 11 is a flowchart illustrating a boom-position computation process.

In step S200, control apparatus 31 starts boom-position computation process B in the method for controlling crane 1, and makes the control proceed to step S210 (see FIG. 11). Then, upon completion of boom-position computation process B, the control proceeds to step S300 (see FIG. 9).

Figure 12:
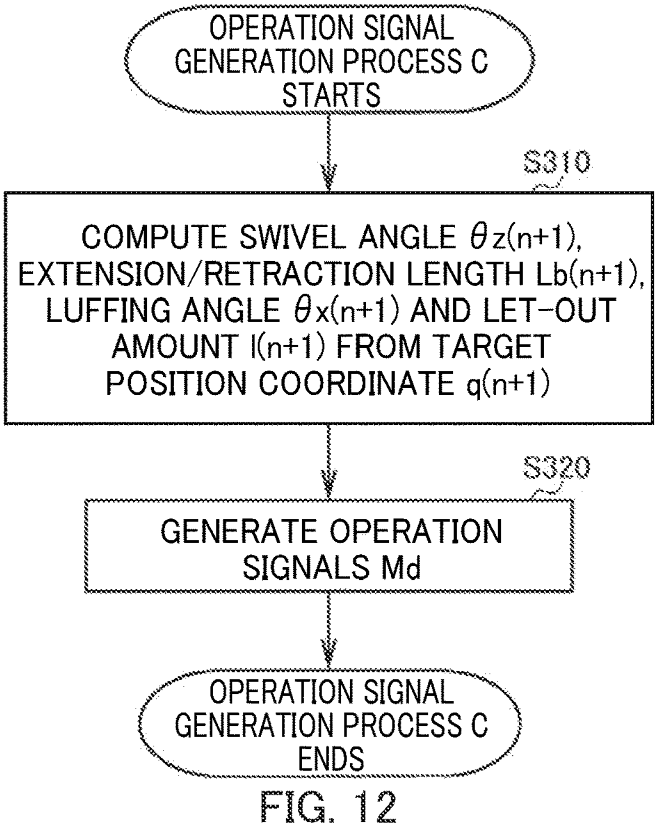
FIG. 12 is a flowchart illustrating an operation-signal generation process.

In step S300, control apparatus 31 starts operation-signal generation process C in the method for controlling crane 1, and makes the control proceed to step S310 (see FIG. 12). Then, upon completion of operation-signal generation process C, the control proceeds to step S100 (see FIG. 9).

As illustrated in FIG. 10, in step S110, target course computation section 31_a_ of control apparatus 31 determines whether or not target speed signal Vd for load W is obtained.

As a result, if target speed signal Vd for load W is obtained, target course computation section 31_a_ makes the control proceed to S120.

On the other hand, if target speed signal Vd for load W is not obtained, target course computation section 31_a_ makes the control proceed to S110.

In step S120, boom position computation section 31_b_ of control apparatus 31 causes an image of load W to be taken using the set of swivel-base cameras 7_a_ on the opposite, left and right, sides of the front of swivel base 7 as a stereo camera, and makes the control proceed to step S130.

In step S130, boom position computation section 31_b_ computes current positional information of load W from the image taken by the set of swivel-base cameras 7_a_, and makes the control proceed to step S140.

In step S140, target course computation section 31_a_ computes target positional information of load W by integrating obtained target speed signal Vd for load W, and makes the control proceed to step S150.

In step S150, target course computation section 31_a_ selects coefficients a, b and index c of transfer function G(s) (see Expression 1) of low-pass filter Lp from database db1 based on settling time Ts and signal magnitude V of obtained target speed signal Vd and computes low-pass filter Lp, and makes the control proceed to step S160.

In step S160, target course computation section 31_a_ computes target course signal Pd every unit time t by applying low-pass filter Lp, which is indicated by transfer function G(s) in Expression 3, to the computed target positional information of load W, and ends target-course computation process A and makes the control proceed to step S200 (see FIG. 9).

As illustrated in FIG. 11, in step S210, boom position computation section 31_b_ of control apparatus 31 computes current position coordinate p(n) of load W, which is a current position of load W, from the obtained current positional information of load W, using arbitrarily-determined reference position O (for example, a center of swiveling of boom 9) as an origin, and makes the control proceed to step S220.

In step S220, boom position computation section 31_b_ computes current position coordinate q(n) of the tip of boom 9 from obtained swivel angle θz(n) of swivel base 7, obtained extension/retraction length lb(n) and obtained luffing angle θx(n) of boom 9, and makes the control proceed to step S230.

In step S230, boom position computation section 31_b_ computes let-out amount l(n) of the wire rope from current position coordinate p(n) of load W and current position coordinate q(n) of boom 9 using Expression 4 above, and makes the control proceed to step S240.

In step S240, boom position computation section 31_b_ computes target position coordinate p(n+1) of load W, which is a target position of load W after a lapse of unit time t, from target course signal Pd with reference to current position coordinate p(n) of load W, and makes the control proceed to step S250.

In step S250, boom position computation section 31_b_ computes an acceleration of load W from current position coordinate p(n) of load W and target position coordinate p(n+1) of load W, and computes direction vector e(n+1) of the wire rope according to Expression 5 above using the gravitational acceleration, and makes the control proceed to step S260.

In step S260, boom position computation section 31_b_ computes target position coordinate q(n+1) of boom 9 from computed let-out amount l(n) of the wire rope and computed direction vector e(n+1) of the wire rope using Expression 6 above, and ends boom-position computation process B and makes the control proceed to step S300 (see FIG. 9).

As illustrated in FIG. 12, in step S310, operation signal generation section 31_c_ of control apparatus 31 computes swivel angle θz(n+1) of swivel base 7, extension/retraction length Lb(n+1), luffing angle θx(n+1) and let-out amount l(n+1) of the wire rope after the lapse of unit time t from target position coordinate q(n+1) of boom 9, and makes the control proceed to step S320.

In step S320, operation signal generation section 31_c_ generates respective operation signals Md for swivel valve 23, extension/retraction valve 24, luffing valve 25 and main valve 26_m_ or sub valve 26_s_ from computed swivel angle 9_z_(n+1) of swivel base 7, computed extension/retraction length Lb(n+1), computed luffing angle θx(n+1) and computed let-out amount l(n+1) of the wire rope, and ends the operation-signal generation process C and makes the control proceed to step S100 (see FIG. 9).

Control apparatus 31 computes target position coordinate q(n+1) of boom 9 by repeating target-course computation process A, boom-position computation process B and operation-signal generation process C, and after a lapse of unit time t, computes direction vector e(n+2) of the wire rope from let-out amount l(n+1) of the wire rope, current position coordinate p(n+1) of load W and target position coordinate p(n+1)p(n+2) of load W. and computes target position coordinate p(n+1)q(n+2) of boom 9 after a further lapse of unit time t from let-out amount l(n+1) of the wire rope and direction vector e(n+2) of the wire rope. In other words, control apparatus 31 computes direction vector e(n) of the wire rope and sequentially computes target position coordinate q(n+1) of boom 9 after unit time t from current position coordinate p(n+1) of load W, target position coordinate p(n+1) of load W and direction vector e(n) of the wire rope using inverse dynamics. Control apparatus 31 controls the actuators based on target position coordinate q(n+1) of boom 9 by means of feedforward control for generating operation signals Md.

Crane 1 configured as described above determines coefficients a, b and index c of transfer function G(s) of low-pass filter Lp, from database Dv1 based on settling time Ts and signal magnitude V of target speed signal Vd for load W, the target speed signal Vd being arbitrarily input from manipulation terminal 32, and thus, it is possible to compute target course signal Pd along with the operator's intention estimated from target speed signal Vd, without performing complicated computation. Also, for crane 1, feedforward control in which a control signal for boom 9 is generated with reference to load W and a control signal for boom 9 is generated based on a target course intended by the operator is employed. Therefore, in crane 1, a delay in response to a manipulation signal is small and swinging of load W due to the delay in response is curbed. Also, an inverse dynamics model is built and target position coordinate q(n+1) of boom 9 is computed from current position coordinate p(n) of load W, current position coordinate p(n) being measured using swivel-base cameras 7*a*, direction vector e(n) of the wire rope and the target position coordinate p(n+1) of load W, enabling curbing an error. Consequently, it is possible to, when an actuator is controlled with reference to a load W, moving the load W along with an operator's intention while curbing swinging of the load W.

Note that in the present embodiment, in crane 1, feedforward control is employed, however, if operation of a hydraulic actuator becomes discontinuous and fluctuates, differentiation element s of transfer function G(s) may exert influence. Therefore, in control according to the present invention, a delay may be corrected by feedback control in addition to feedforward control, for stabilization (enhancement in robustness).

Next, a second embodiment of the method of determining coefficients a, b and index c of transfer function G(s) of low-pass filter Lp in control apparatus 31 will be described with reference to FIGS. 13 and 14. Note that by using names, figure numbers and reference numerals used in the description of crane 1 and the control process illustrated in FIGS. 1 to 12, correction of target speed signal Vd according to the below embodiment indicates those that are the same as above, and in the below embodiment, specific description of points that are similar to those of the embodiments described above is omitted and differences from the embodiments described above will mainly be described.

Figure 13:
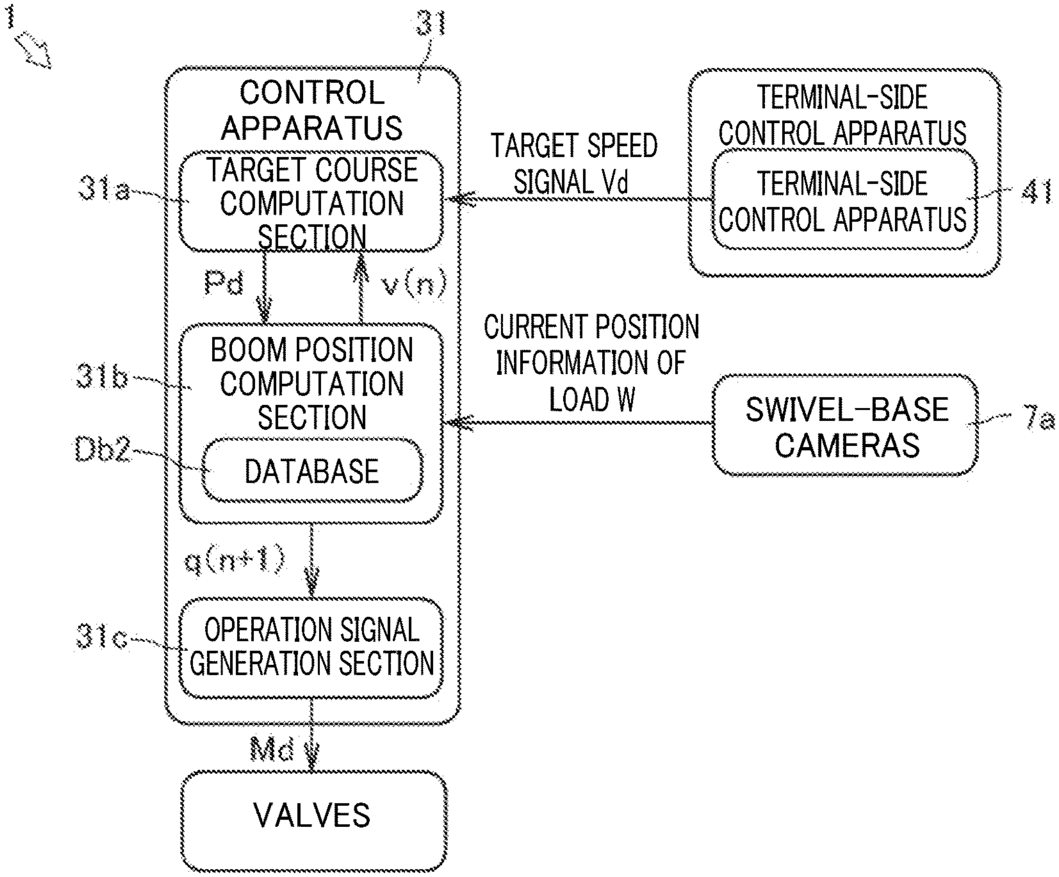
FIG. 13 is a block diagram illustrating a control configuration of a control apparatus in a second embodiment.

As illustrated in FIG. 13, boom position computation section 31*b* of control apparatus 31 includes database Dv2 in which coefficients a, b and indexes c set in advance for each current position coordinate q(n) of boom 9 by experiments or the like. Low-pass filter Lp is configured such that coefficients a, b and index c of transfer function G(s) are set to arbitrary values based on current position coordinate q(n) of boom 9.

Boom position computation section 31*b* computes current position coordinate q(n) of boom 9 from obtained swivel angle θz(n), obtained extension/retraction length lb(n) and obtained luffing angle θx(n). Furthermore, based on obtained current position coordinate q(n) of boom 9, boom position computation section 31*b* obtains corresponding coefficients a, b and corresponding index c from database Dv2 and computes transfer function G(s) of low-pass filter Lp. For example, if boom position computation section 31*b* determines from computed current position coordinate q(n) of boom 9 that boom 9 is largely extended, boom position computation section 31*b* selects coefficients a3, b3 and index c3 that curb swinging of load W, from database db2.

Next, a control process for computation of corrected course signal Pdc of load W and computation of target position coordinate q(n+1) of a tip of boom 9 to generate operation signals Md in control apparatus 31 will be described in detail.

Figure 14:
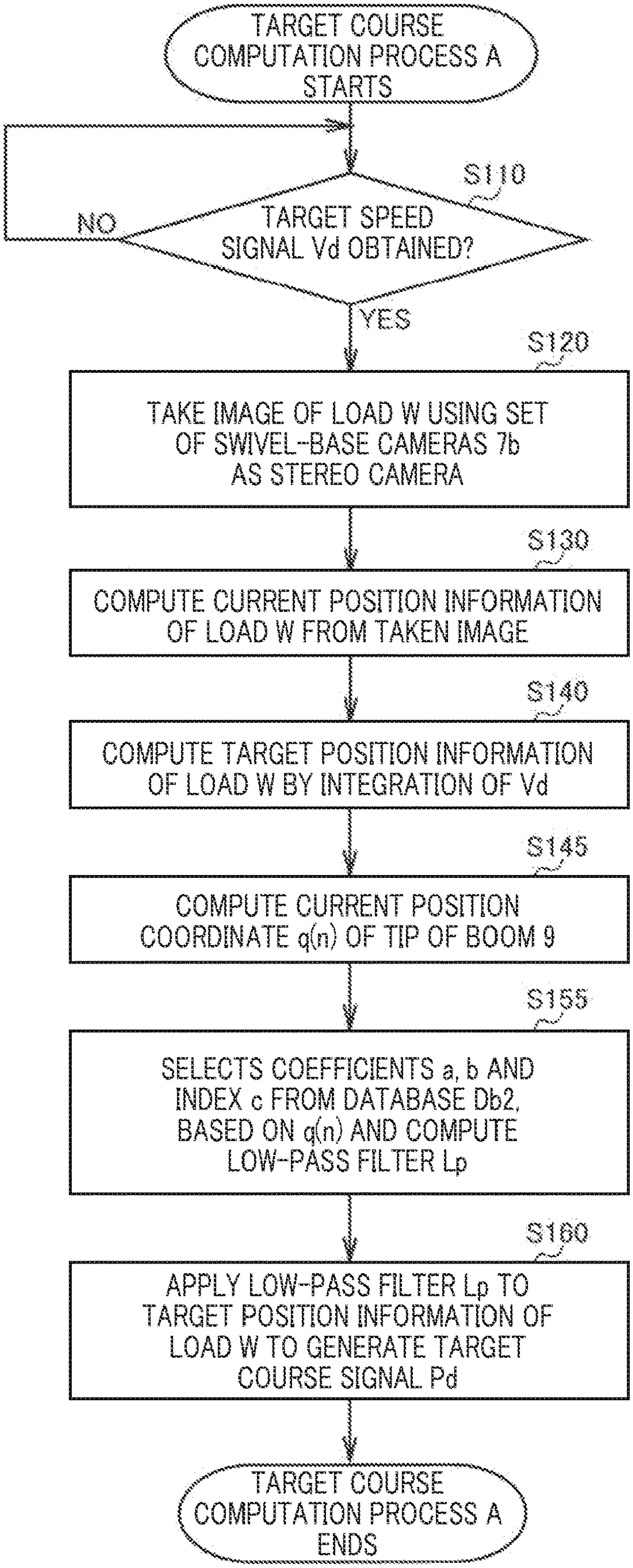
FIG. 14 is a flowchart illustrating a target-course computation process in the second embodiment.

As illustrated in FIG. 14, in step S140, target course computation section 31*a* computes target position information of load W by integrating obtained target speed signal Vd of load W, and makes the control proceed to step S145.

In step S145, boom position computation section 31*b* computes current position coordinate q(n) of the tip of boom 9 from obtained swivel angle θz(n) of swivel base 7, obtained extension/retraction length lb(n) and obtained luffing angle θx(n) of boom 9, and makes the control proceed to step S155.

In step S155, target course computation section 31*a* obtains current position coordinate q(n) of the tip of boom 9 from boom position computation section 31*b*, and based on current position coordinate q(n) of the tip of boom 9, selects coefficients a, b and index c of transfer function G(s) of low-pass filter Lp from database db2 and computes low-pass filter Lp. and makes the control proceed to step S160.

Crane 1 configured as described above determines coefficients a, b and index c of transfer function G(s) of low-pass filter Lp from database Dv2 based on a postural state of crane 1, enabling computing target course signal Pd according to a magnitude of swinging estimated from the postural state. Consequently, it is possible to, when the actuators are controlled with reference to load W, move load W along an operator's intention with a posture of crane 1 taken into consideration w % bile curbing swinging of load W.

Note that as the method of determining coefficients a, b and index c of transfer function G(s) of low-pass filter Lp, the first embodiment based on target speed signal Vd and the second embodiment based on current position coordinate q(n) of boom 9 have been indicated, coefficients a, b and index c may be computed based on target speed signal Vd and current position coordinate q(n) of boom 9. For example, selecting coefficients a, b and index c from database db3 in which coefficients a, b and index c based on settling time Ts and signal magnitude V of target speed signal Vd are set for each extension/retraction length of boom 9 enables properly curbing swinging of load W without an operator paying attention to a posture of crane 1.

Also, although in the present embodiment, crane 1 is configured to select coefficients a, b and index c of transfer function G(s) of low-pass filter Lp from database db1 or db2 or the like, coefficients a, b and index c may be determined by mechanical learning based on control states of other cranes obtained via a network and historical data of coefficients a, b and indexes c or the like in such control states.

Each of the embodiments described above merely indicate a typical mode and can be variously modified and carried out without departing from the essence of an embodiment. Furthermore, it is needless to say that the present invention can be carried out in various modes, and the scope of the present invention is defined by the terms of the claims and includes any modifications within the scope and meaning equivalent to the terms of the claims.

INDUSTRIAL APPLICABILITY

The present invention is applicable to a crane.

REFERENCE SIGNS LIST

1 Crane
6 Crane apparatus
9 Boom
O Reference position
W Load
Vd Target speed signal
p(n) Current position coordinate of load
p(n+1) Target position coordinate of load
q(n) Current position coordinate of boom
q(n+1) Target position coordinate of boom

The invention claimed is:

1. A crane in which an actuator is controlled based on a target speed signal relating to a moving direction and a speed of a load suspended by a wire rope supported by a boom, the crane comprising:

a manipulation tool with which the speed and the moving direction of the load for the target speed signal are input; and control circuitry that is configured to generate an operation signal for the actuator based on the target speed signal;

wherein the control circuitry is configured to compute a target course signal by integrating the target speed signal input from the manipulation tool and attenuating a frequency component in a predetermined frequency range via a filter expressed by Expression 1, compute a target position of the load relative to the reference position based on the target course signal, compute a current position of a boom tip relative to the reference position based on a swivel angle of the boom, a luffing angle of the boom, and an extension/retraction length of the boom, compute a let-out amount of the wire rope based on the current position of the load and the current position of the boom tip, compute a direction vector of the wire rope based on the current position of the load and the target position of the load, compute a target position of the boom tip for the target position of the load based on the let-out amount of the wire rope and the direction vector of the wire rope, and generate an operation signal for the actuator based on the target position of the boom tip,

[1]

(Expression 1)

$$G(s) = \frac{a}{(s+b)^c} \quad (1)$$

where each of a and b is a coefficient, c is an index and s is a differentiation element.

2. The crane according to claim 1, wherein coefficient a, coefficient b and index c in Expression 1 are determined based on a settling time and the speed of the load in the target speed signal.

3. The crane according to claim 1, wherein coefficient a, coefficient b and index c in Expression 1 is determined based on the current position of the boom tip.

4. The crane according to claim 2, comprising a database in which coefficient a, coefficient b and index c are set for each predetermined condition, wherein coefficient a, coefficient b and index c corresponding to an arbitrary condition are selected from the database.

* * * * *